United States Patent
Yoo et al.

(10) Patent No.: US 7,589,043 B2
(45) Date of Patent: Sep. 15, 2009

(54) SUPPORTED CATALYST, ELECTRODE USING THE SUPPORTED CATALYST AND FUEL CELL INCLUDING THE ELECTRODE

(75) Inventors: Dae-jong Yoo, Yongin-si (KR); Chan-ho Pak, Seoul (KR); Seol-ah Lee, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 342 days.

(21) Appl. No.: 11/445,333

(22) Filed: Jun. 2, 2006

(65) Prior Publication Data
US 2007/0059585 A1    Mar. 15, 2007

(30) Foreign Application Priority Data
Sep. 14, 2005    (KR)    .................... 10-2005-0085590

(51) Int. Cl.
| | |
|---|---|
| H01M 4/00 | (2006.01) |
| H01M 4/88 | (2006.01) |
| H01M 8/00 | (2006.01) |
| B01J 21/18 | (2006.01) |
| B01J 23/00 | (2006.01) |
| B01J 23/40 | (2006.01) |
| B01J 23/74 | (2006.01) |
| B32B 5/16 | (2006.01) |
| B32B 9/00 | (2006.01) |
| B32B 15/02 | (2006.01) |
| B32B 19/00 | (2006.01) |
| B32B 21/02 | (2006.01) |
| B32B 23/02 | (2006.01) |
| B32B 27/02 | (2006.01) |

(52) U.S. Cl. .................. 502/180; 502/101; 502/182; 502/185; 429/12; 429/40; 429/41; 429/42; 429/43; 429/44; 428/403

(58) Field of Classification Search .................. 502/180, 502/182, 185, 101; 429/40–44, 12; 428/403
See application file for complete search history.

(56) References Cited

U.S. PATENT DOCUMENTS 3,485,658 A  * 12/1969  Iler .............................. 428/328

(Continued)

FOREIGN PATENT DOCUMENTS

CN          1636634 A       7/2005

(Continued)

OTHER PUBLICATIONS

"Structure of Pt/C and PtRu/C catalytic layers prepared by plasma sputtering and electric performance in direct methanol fuel cells (DMFC)," A. Caillard et al. Journal of Power Sources 162 (2006), pp. 66-73.*

(Continued)

Primary Examiner—Patricia L Hailey
(74) Attorney, Agent, or Firm—Stein McEwen LLP

(57) ABSTRACT

Provided are a supported catalyst, an electrode including the same, and a fuel cell using the electrode. The supported catalyst includes a carbon-based catalyst support and metal catalyst particles having an average diameter of 3.5 to 5 nm and an amount of 80 to 90 parts by weight based on 100 parts by weight of the supported catalyst in a multi-layer structure adsorbed on a surface of the carbon-based catalyst support. In the supported catalyst of the present invention, as small metal catalyst particles with an average diameter of 3.5 to 5 nm are dispersed with high concentration, high dispersion, and the multi-layer structure, catalytic efficiency is increased. A fuel cell having improved energy density and fuel efficiency characteristics can be prepared using an electrode formed using the supported catalyst.

9 Claims, 8 Drawing Sheets

U.S. PATENT DOCUMENTS

| | | | |
|---|---|---|---|
| 4,136,059 A * | 1/1979 | Jalan et al. | 502/101 |
| 5,413,984 A * | 5/1995 | Marecot et al. | 502/333 |
| 5,702,836 A * | 12/1997 | Ma et al. | 429/13 |
| 6,551,960 B1 | 4/2003 | Laine et al. | |
| 6,686,308 B2 | 2/2004 | Mao et al. | |
| 6,753,290 B1 * | 6/2004 | Romanenko et al. | 502/185 |
| 6,797,667 B2 * | 9/2004 | Ruth et al. | 502/182 |
| 7,037,873 B2 * | 5/2006 | Kato | 502/180 |
| 7,122,501 B2 * | 10/2006 | Paparatto et al. | 502/339 |
| 7,150,866 B2 * | 12/2006 | Wieland et al. | 423/652 |
| 7,205,255 B2 * | 4/2007 | Yamamoto | 502/101 |
| 7,419,741 B2 * | 9/2008 | Vernstrom et al. | 429/44 |
| 2003/0039860 A1 * | 2/2003 | Cheon et al. | 428/694 T |
| 2003/0047459 A1 * | 3/2003 | Timonov et al. | 205/170 |
| 2006/0135359 A1 * | 6/2006 | Adzic et al. | 502/326 |
| 2007/0269699 A1 * | 11/2007 | Pak et al. | 429/30 |

FOREIGN PATENT DOCUMENTS

| | | |
|---|---|---|
| CN | 1645655 A | 7/2005 |
| JP | 2000-467 | 1/2000 |
| JP | 2001-357857 | 12/2001 |
| JP | 2002-289208 | 10/2002 |
| JP | 2003-24798 | 1/2003 |
| JP | 2003-226901 | 8/2003 |
| JP | 2003-277033 * | 10/2003 |
| JP | 2004-146223 | 5/2004 |
| JP | 2004-335252 | 11/2004 |
| JP | 2005-108838 | 4/2005 |
| JP | 2005-118671 | 5/2005 |
| JP | 2005-324156 | 11/2005 |
| JP | 2006-175365 | 7/2006 |
| JP | 2007-075811 * | 3/2007 |
| WO | WO 03/061827 A2 | 7/2003 |

OTHER PUBLICATIONS

Office Action issued by a Chinese Patent Office in Chinese Patent Application No. 2006101076855 on May 30, 2008.

Office Action issued by the Japanese Patent Office in Japanese Patent Application No. 2006-155438 on Jun. 2, 2009.

* cited by examiner

SUPPORTED CATALYST, ELECTRODE USING THE SUPPORTED CATALYST AND FUEL CELL INCLUDING THE ELECTRODE

CROSS-REFERENCE TO RELATED APPLICATION

This application claims the benefit of Korean Patent Application No. 2005-85590, filed on Sep. 14, 2005, in the Korean Intellectual Property Office, the disclosure of which is incorporated herein in its entirety by reference.

BACKGROUND OF THE INVENTION

1. Field of the Invention

Aspects of the present invention relate to a supported catalyst and a fuel cell using the same, and more particularly, to a high-concentration, high-dispersity carbon-supported catalyst with improved catalytic efficiency manufactured using a polyol process, in which metal catalyst particles, such as platinum, are impregnated on a surface of a carbon-based catalyst support through a polyol process so as to form a mono-layer structure or multi-layer structure, and a fuel cell using the carbon-supported catalyst.

2. Description of the Related Art

Fuel cells are sources of clean energy and have the potential to replace fossil fuels, since they have a high power density and a high energy-conversion efficiency. Fuel cells can be operated at an ambient temperature and can be miniaturized and hermetically sealed. Thus, fuel cells can be used in a wide range of applications such as zero-emission vehicles, household power generating systems, mobile telecommunications equipment, medical equipment, military equipment, space equipment, and portable electronic devices.

Proton exchange membrane fuel cells (PEMFCs) or direct methanol fuel cells (DMFCs) are power-generating systems that produce direct current through an electrochemical reaction of methanol, water, and oxygen. These fuel cells include an anode and a cathode where liquid and gas are supplied and have a structure in which a proton conductive membrane is interposed between the anode and the cathode. A catalyst is contained in the anode and the cathode. The catalyst in the anode decomposes hydrogen or methanol to form protons which pass through the proton conductive membrane and react with oxygen in the presence of the catalyst in the cathode, as part of an overall process that generates electricity.

As described above, the catalyst is contained in the cathode and/or anode of the fuel cell to promote the electrochemical oxidation of fuel and/or the electrochemical reduction of oxygen.

In PEMFCs, a catalyst with platinum particles dispersed in an amorphous carbon support is used as the catalyst for the anode and the cathode. In DMFCs, PtRu is used in the anode, and platinum particles or a catalyst that has platinum particles dispersed in a carbon support is used in the cathode.

Methods of manufacturing a supported catalyst with platinum particles or platinum-ruthenium particles dispersed in a carbon support are disclosed in U.S. Pat. Nos. 6,686,308 and 6,551,960.

According to the methods of manufacturing described in the above-identified patents, if metal catalyst particles such as platinum particles are dispersed in the carbon support, the platinum particles may be covered with carbon particles to such an extent that the weight of the metal catalyst particles increases by 80% or more. An increase in the size of the metal catalyst particles leads to problems in impregnation. Thus, catalytic activities and uses decrease, leading to a decline in the performance of unit cells.

SUMMARY OF THE INVENTION

Aspects of the present invention provide a high-concentration supported catalyst having improved catalytic activities and utilization efficiency in which catalyst metal particles are highly dispersed on a carbon-based catalyst support so as to form a mono-layer and in which other catalyst metal particles are impregnated on the catalyst metal particle mono-layer so as to form multi-layers, and provide a method of manufacturing the high-concentration supported catalyst.

Aspects of the present invention also provide an electrode including the supported catalyst described above and a fuel cell having improved energy density and fuel efficiency characteristics by using the electrode described therein.

According to an aspect of the present invention, there is provided a supported catalyst including: a carbon-based catalyst support; and a multi-layer structure of metal catalyst particles having an average diameter of 3.5 to 5 nm adsorbed on a surface of the carbon-based catalyst support. The amount of metal catalyst particles is 80 to 90 parts by weight based on 100 parts by weight of the supported catalyst.

According to another aspect of the present invention, there is also provided a supported catalyst including: a carbon-based catalyst support; and a mono-layer structure of metal catalyst particles having an average diameter of 2.5 to 3 nm on the carbon-based catalyst support. The amount of metal catalyst particles is 60 to 80 parts by weight based on 100 parts by weight of the supported catalyst.

According to an aspect of the present invention, there is provided a method of preparing the supported catalyst, the method including: (a) mixing a catalyst metal precursor and a polyalcohol to prepare a mixture containing the catalyst metal precursor; (b) mixing a carbon-based catalyst support and a mixture of a polyalcohol and water to prepare a mixture containing the carbon-based catalyst support; and (c) mixing the mixture containing the catalyst metal precursor and the mixture containing the carbon-based catalyst support, adjusting the pH of the mixture, and heating the pH-adjusted mixture.

In the present invention, there may be a further method of preparing the supported catalyst including: repeatedly performing operation (a) through operation (c) at least 1 additional time on the resultant from operation (c).

According to another aspect of the present invention, there is provided an electrode having the supported catalyst described above or formed by the method described above.

According to another aspect of the present invention, there is provided a fuel cell having improved energy performance such as a cell potential by using an electrode having the supported catalyst described above or formed by the method described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
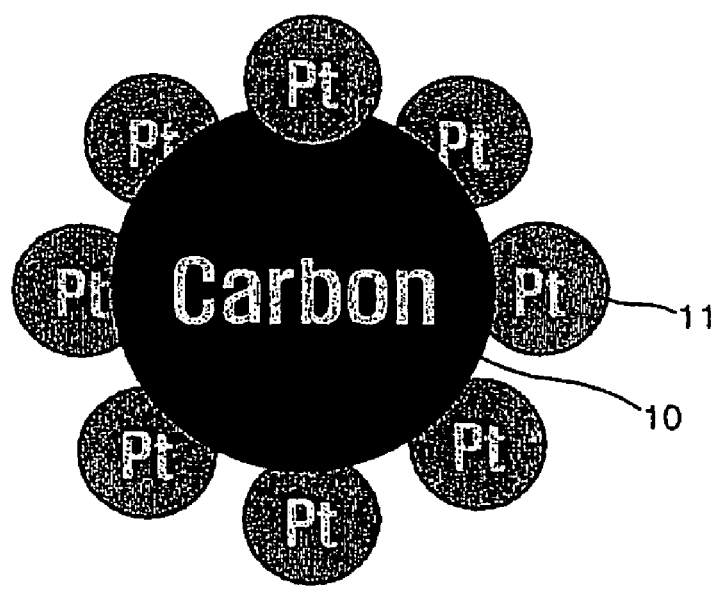
FIGS. 1 and 2 are schematic diagrams of supported catalyst structures according to embodiments of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
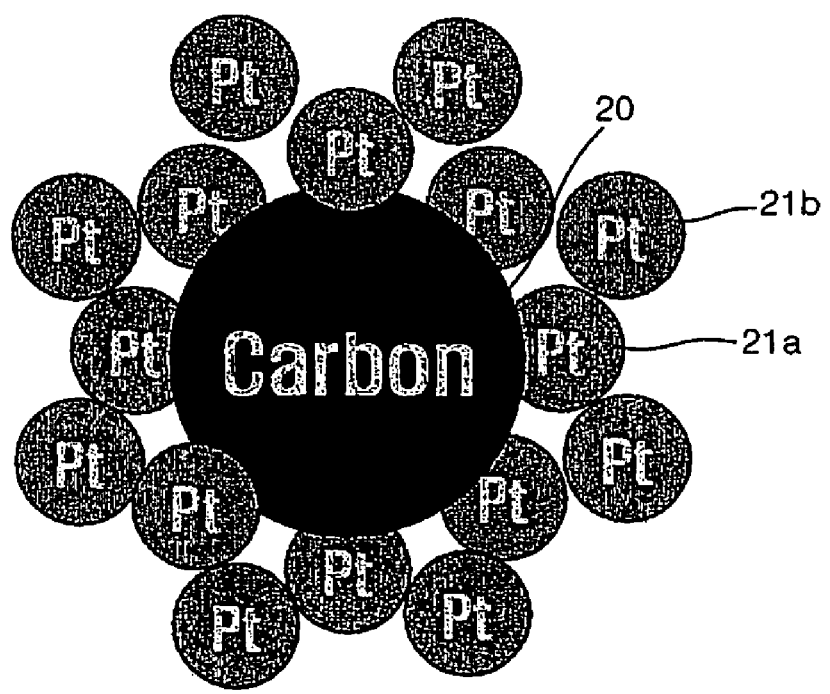
Figure 3:
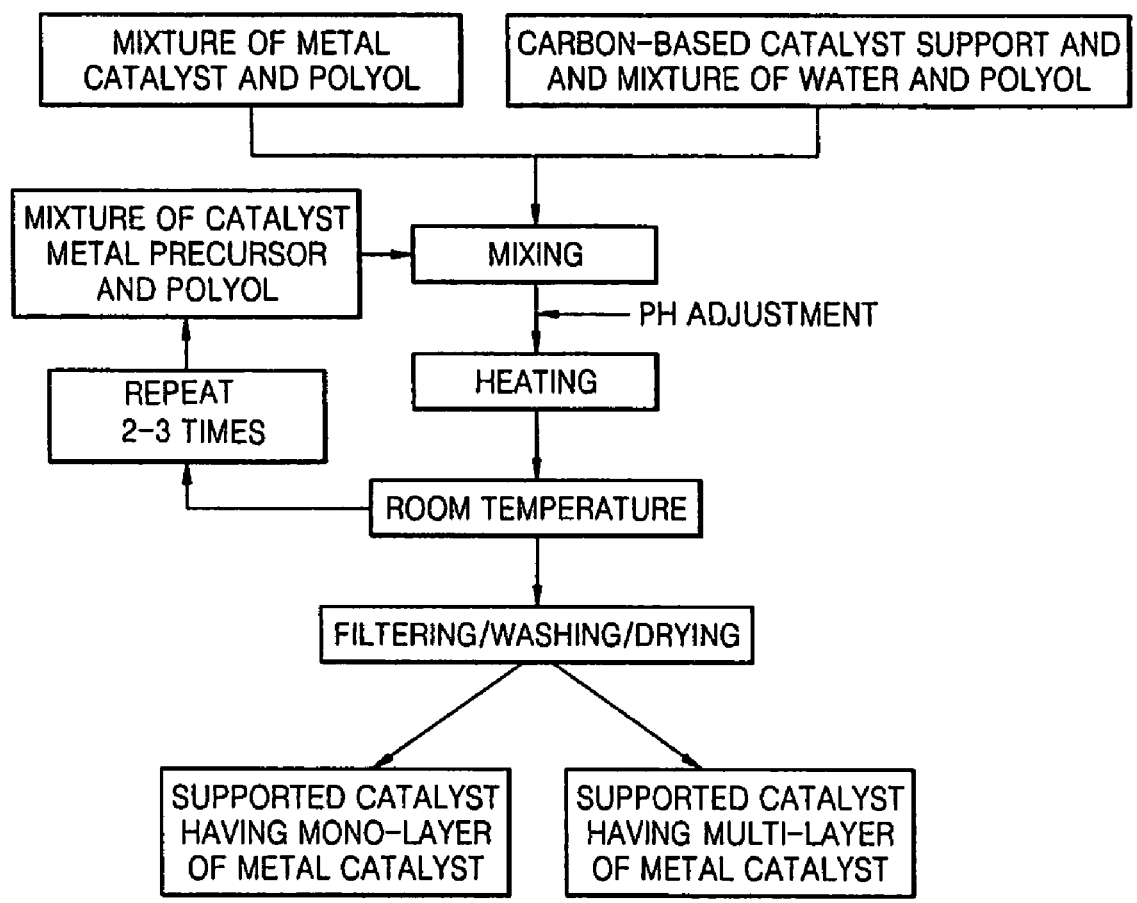
FIG. 3 is a flowchart illustrating a process of manufacturing a supported catalyst according to an embodiment of the present invention.
Figure 4A:
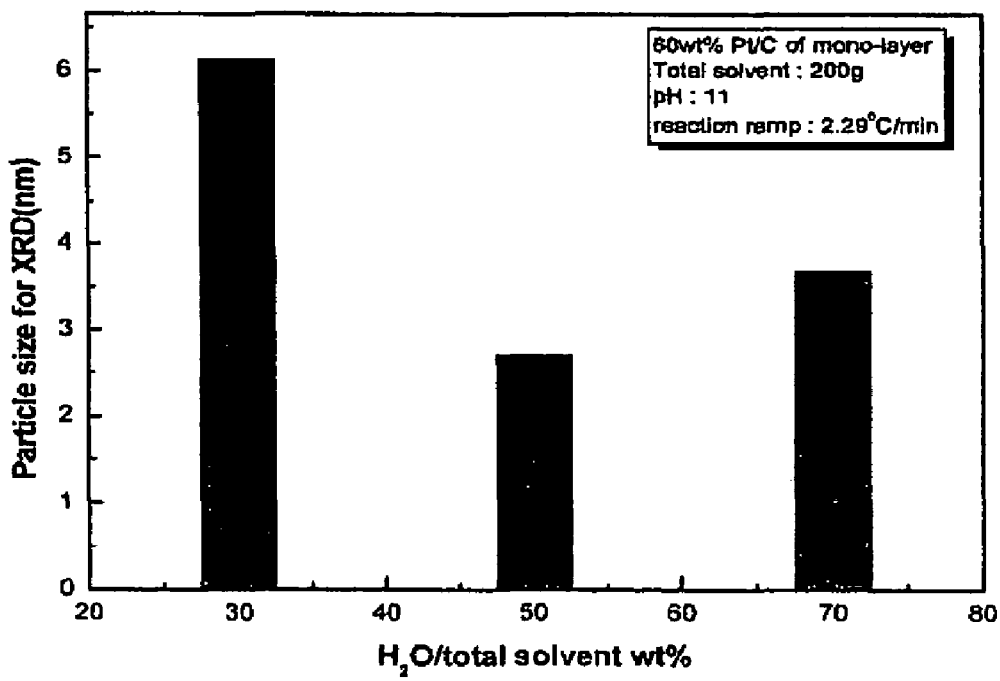
FIGS. 4A through 4C are graphs showing variables that influence the size of metal catalyst particles in the process of manufacturing the supported catalyst according to an embodiment of the present invention.
Figure 4B:
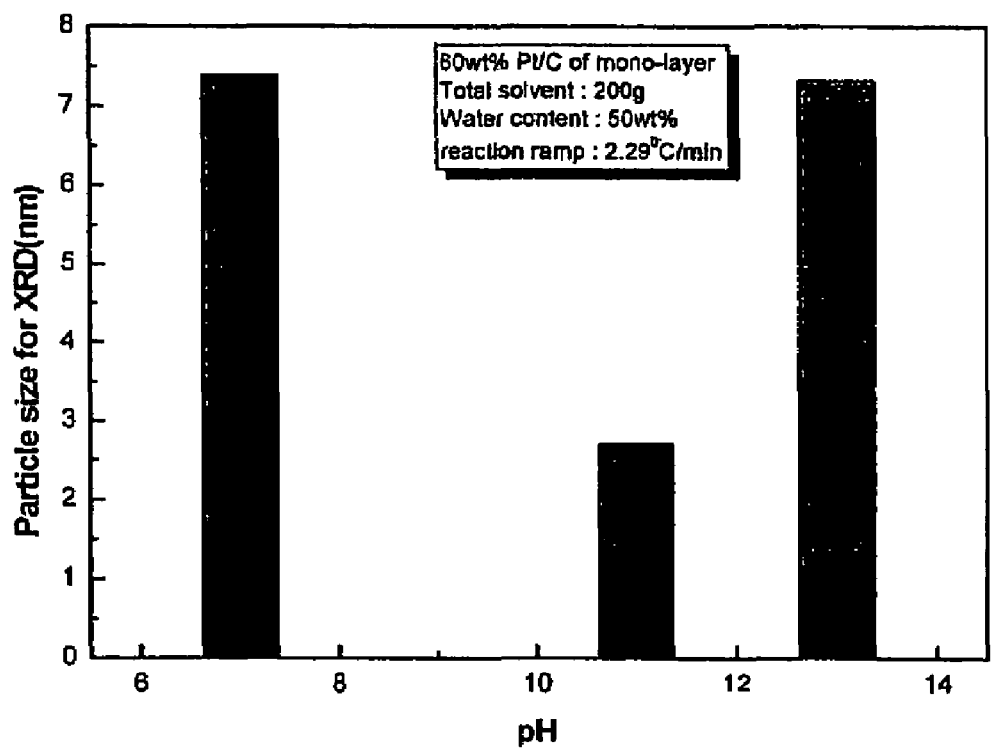
Figure 4C:
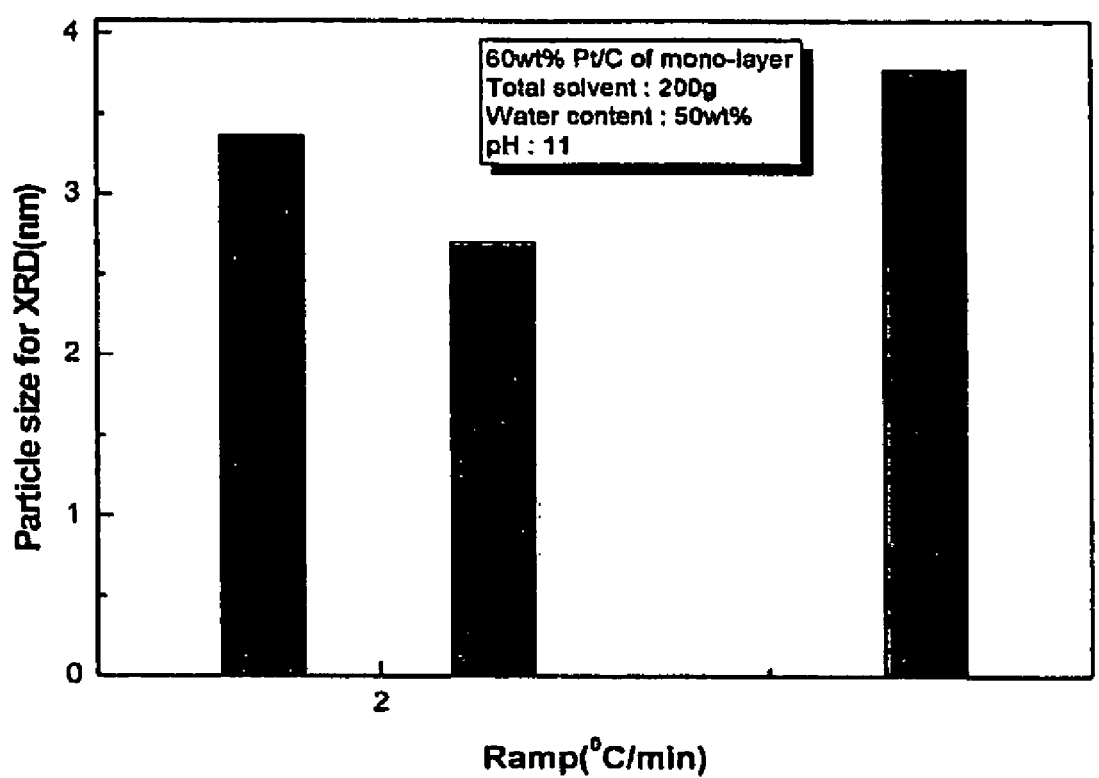

FIGS. 1 and 2 are schematic diagrams of supported catalyst structures according to embodiments of the present invention. A highly concentrated carbon-supported catalyst according to an embodiment of the present invention has metal catalyst particles 11 in an amount of 60 to 80 parts by weight based on 100 parts by weight of the supported catalyst and having an average particle diameter of 2-3.5 nm. The metal catalyst particles 11 are combined on a carbon-based catalyst support 10 and may form a mono-layer structure as illustrated in FIG. 1. Here, the term 'mono-layer' refers to a layer dispersed on the carbon without an agglomeration of the metal catalyst particles 11 on the carbon-based catalyst support 10.

If the amount and the average diameter of the metal catalyst particles 11 are below or above the ranges described above, catalytic activity may not occur.

Referring to FIG. 2, a highly concentrated carbon-supported catalyst according to another embodiment of the present invention has metal catalyst particles 21a and 21b in an amount of 80 to 90 parts by weight based on 100 parts by weight of the supported catalyst and having an average particle diameter of 3.5-5 nm. The metal catalyst particles 21a and 21b form a multi-layer structure as illustrated in FIG. 2. Here, the term 'multi-layer' refers to a structure including a carbon-based support 20, first metal catalyst particles 21a dispersed on the carbon, and second metal catalyst particles 21b impregnated on the first metal catalyst particles 21a instead of impregnating on the surface of the carbon-based support 20 where the first metal catalyst particles 21a are not dispersed.

When the amount of the first and second metal catalyst particles 21a and 21b is below 80 parts by weight, the multi-layer structure may not be formed and the use of the catalyst may decrease. On the other hand, when the amount of the first and second metal catalyst particles 21a and 21b is above 90 parts by weight, the size of the first and second metal catalyst particles 21a and 21b increases and catalytic activity may not occur. Also, when the average diameter of the first and second metal catalyst particles 21a and 21b is below 3.5 nm or above 5 nm, catalytic activity may not occur.

In the supported catalyst according to the current embodiment of the present invention, the number of layers of the multi-layer structure is preferably 2 or more for catalytic efficiency.

Hereinafter, referring to FIGS. 3 and 4A through 4C, a method of manufacturing the supported catalyst according to aspects of the present invention and variables in the process will be described below, according to embodiments of the present invention.

The manufacturing of the supported catalyst according to aspects of the present invention is performed by impregnating metal catalyst particles into a catalyst support. In this process which will be described below, a polyalcohol that acts as a reducing agent or a solvent is used. The manufacturing process is referred to as a liquid catalyst impregnating process.

A metal catalyst precursor is dissolved in a polyalcohol, and a mixture containing the metal catalyst precursor is prepared. As non-limiting examples, the polyalcohol may be ethylene glycol, diethylene glycol or triethylene glycol, and the amount of the metal catalyst precursor may be 0.2 to 0.8 parts by weight, particularly 0.471 to 0.503 parts by weight, based on 100 parts by weight of the reaction solution (here, the weight of the reaction solution refers to a total of polyalcohol dissolving the metal precursor and polyalcohol dispersing carbon and water, as described below). When the amount of the metal precursor is below 0.2 parts by weight, the total amount of the solution is increased and the metal catalyst exists as colloid particles in the solution instead of forming on the carbon. When the amount of the metal precursor is above 0.8 parts by weight, the amount of the solution for the metal precursor to reduce is insufficient and the size of the particles is greatly increased.

The amount of the polyalcohol is $10^5$ to $2\times10^5$ parts by weight based on 100 parts by weight of the catalyst metal precursor. When the amount of polyalcohol is below $10^5$ parts by weight, the reduction ability of protons is decreased, thereby resulting in large catalyst particles. When the amount of polyalcohol is above $2\times10^5$ parts by weight, the reduction ability of protons is increased, thereby resulting in many small catalyst particles, leading to agglomeration.

Examples of platinum precursors among the catalyst metal precursors include tetrachloroplatinate ($H_2PtCl_4$), hexachloroplatinate ($H_2PtCl_6$), potassium tetrachloroplatinate ($K_2PtCl_4$), potassium hexachloroplatinate ($K_2PtCl_6$), and the like, or a mixture thereof. Ru precursors include $(NH_4)_2[RuCl_6]$, $(NH_4)_2[RuCl_5H_2O]$, and the like, and Au precursors include $H_2[AuCl_4]$, $(NH_4)_2[AuCl_4]$, $H[Au(NO_3)_4]H_2O$, and the like.

In the case of an alloy catalyst, a mixture of precursors having a mixing ratio corresponding to the desired atomic ratio of metals is used.

Separately, a mixture containing the carbon-based catalyst support is prepared by dispersing the carbon-based catalyst support with a mixture of polyalcohol and water.

The carbon-based catalyst support is not particularly restricted, but is porous and has a surface area of 250 m$^2$/g or more, preferably 500-1200 m$^2$/g and an average particle diameter of 10-500 nm, preferably 20-300 nm. When the surface area is below this range, an impregnating ability of the catalyst particles may be insufficient.

The carbon-based catalyst support satisfying the requirements described above may be at least one material selected from the group consisting of carbon black, Ketzen black (KB), acetylene black, activated carbon powder, carbon molecular sieve, carbon nanotubes, activated carbon having micropores, and mesoporous carbon, as non-limiting examples. In particular, Ketzen black (KB) may be used.

In the reaction solution, that is, the mixture of polyalcohol and water, the amount of water is 40 to 60 parts by weight based on 100 parts by weight of the reaction solution. (here, the weight of the reaction solution denotes a total of polyalcohol dissolving the metal precursor and the polyalcohol dispersing the carbon and water). When the amount of water is below this range, water as a reducing agent in a reduction process is insufficient and the size of the metal particles may be increased. When the amount of water is above this range, the concentration of polyalcohol is relatively low and the size of the metal particles may be increased.

The carbon-based catalyst support may be hydrophilically modified, if necessary.

After the mixture containing the metal catalyst precursors is mixed with the mixture containing the carbon-based catalyst support particles according to the above-described process, the pH of the obtained mixture is adjusted to a range of 9 to 13, such as, for example, a range of 10 to 11, and then heated. When the pH of the mixture is below this range, the metal catalyst particles such as Pt particles may form a colloid and thus, a support may not be formed in the solution. When the pH of the mixture is above this range, an agglomeration of Pt particles may be formed on the carbon and the size of the particles may be increased.

The heating temperature may be in a range of 90-115° C., such as, for example, in a range of 105-110° C. The heating rate may be in a range of 1.5 to 3.5° C./min, such as, for example, in a range of 2.1 to 2.4° C./min. When the heating temperature is below this range, a complete reduction of the catalyst metal particles does not occur. When the heating temperature is above this range, a sudden boiling reaction of the reaction solution may occur and the amount of water in the reaction solution may be inappropriate, increasing the size of the particles. When the heating rate is below this range, the generation speed of the metal catalyst particles such as Pt particles is slow and thus, the size of the particles increases. When the heating rate is above this range, the produced particles have a particle size that is too small and thus may easily agglomerate.

After the heating process under the conditions described above, the resulting product is cooled to room temperature (25° C.) and then, the supported catalyst of the present invention can be obtained using a work-up process including filtering, washing and lyophilization.

According to the method of manufacturing the supported catalyst according to an aspect of the present invention, a supported catalyst having a mono-layer structure of metal catalyst particles can be obtained, as illustrated in FIG. 1. In such a supported catalyst, the amount of the metal catalyst particles is 60 to 80 parts by weight based on 100 parts by weight of the supported catalyst. The amount of the carbon-based catalyst support is 20 to 40 parts by weight. The average diameter of the metal catalyst particles is 2 to 3 nm.

In order to obtain a supported catalyst having a multi-layer structure of metal catalyst particles as illustrated in FIG. 2, the reduction process is repeatedly performed. In detail, the mixture of the metal catalyst precursors obtained by dissolving the metal catalyst precursors in polyalcohol and the mixture of the carbon-based catalyst support obtained by dispersing the carbon-based catalyst support with the mixture of polyalcohol and water are mixed with the product obtained using the heating process described above and then the heating process is repeatedly preformed, preferably 2 to 3 times. Here, the heating temperature and the heating rate are as described above.

After cooling the resultant obtained from the heating process to room temperature, the supported catalyst having the multi-layer structure can be obtained using the work-up process including filtering, washing and lyophilization as in FIG. 2. In such a supported catalyst, the amount of the metal catalyst particles is 80 to 90 parts by weight based on 100 parts by weight of the supported catalyst. The amount of the carbon-based catalyst support is 10 to 20 parts by weight. The average diameter of the metal catalyst particles is 3.5 to 5 nm.

In the supported catalyst obtained according to an embodiment of the present invention, the phenomenon that the metal catalyst particles are dispersed in the catalyst support having a mono-layer or multi-layer structure may be identified through Transmission Electron Microscopy (TEM).

The supported catalyst prepared according to the above process may be applied to an electrode catalyst layer of a fuel cell. In particular, the fuel cell may be a direct methanol fuel cell (DMFC).

Also, the supported catalyst according to aspects of the present invention may be used as a catalyst for various chemical reactions including hydrogenation, dehydrogenation, coupling, oxidation, isomerization, decarboxylation, hydrocracking and alkylation.

Figure 5:
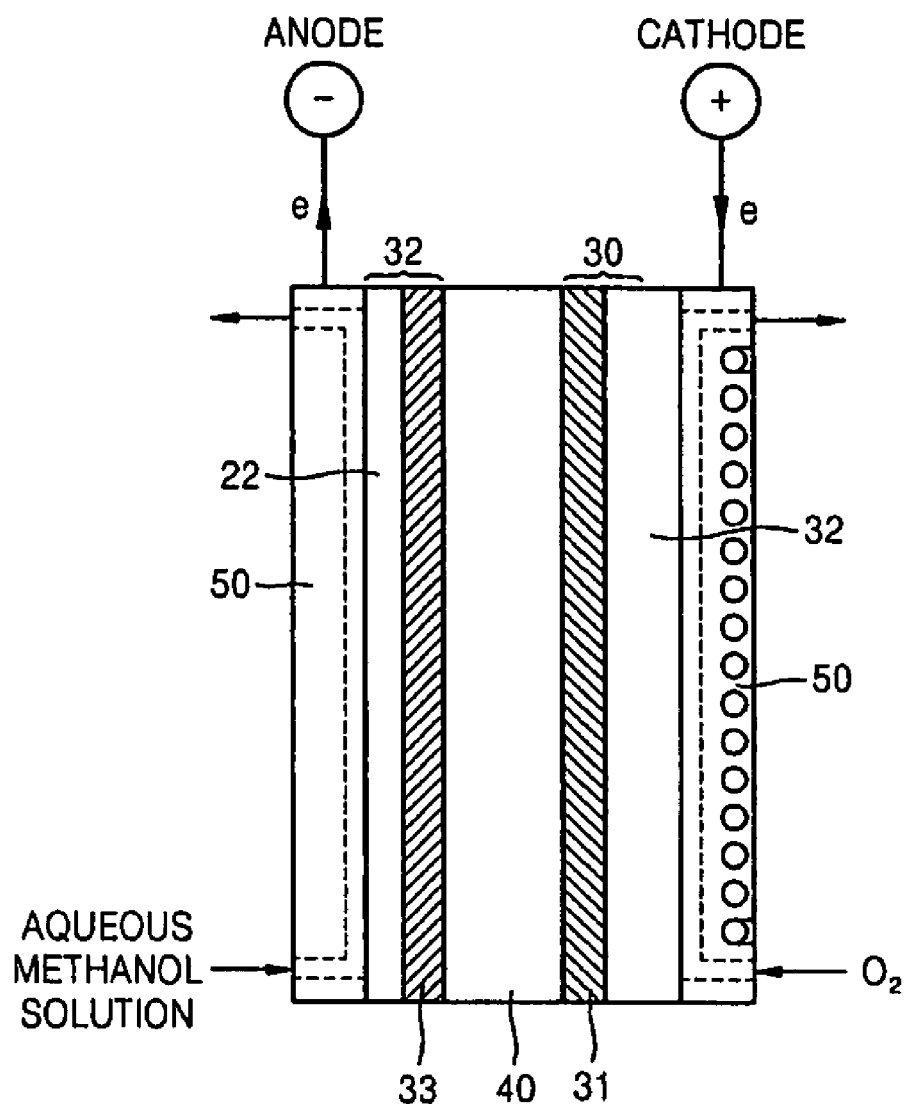
FIG. 5 illustrates a structure of a fuel cell according to an embodiment of the present invention.
Figure 6:
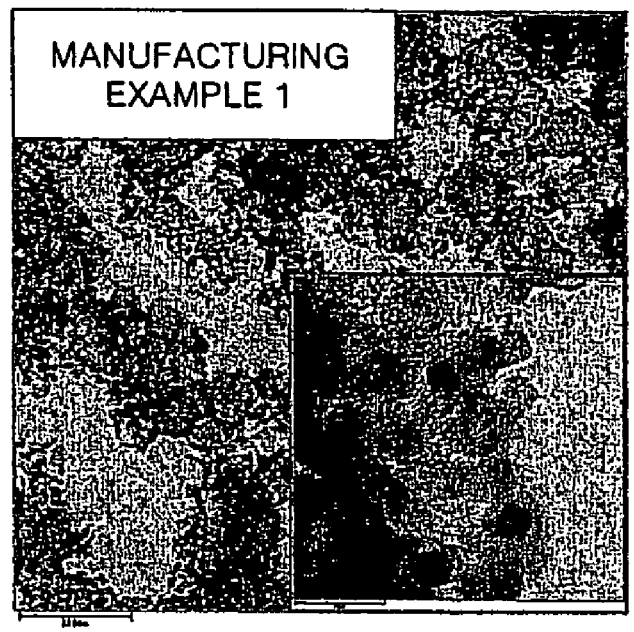
FIGS. 6 through 9 are Scanning Electron Microscopy (SEM) images of supported catalysts obtained according to Manufacturing Examples 1 and 4 and Comparative Manufacturing Examples 1 and 5 of the present invention.
Figure 7:
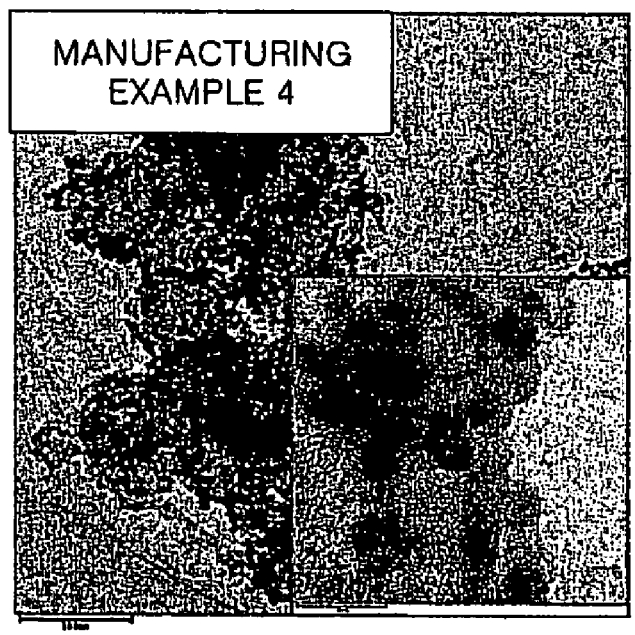
Figure 8:
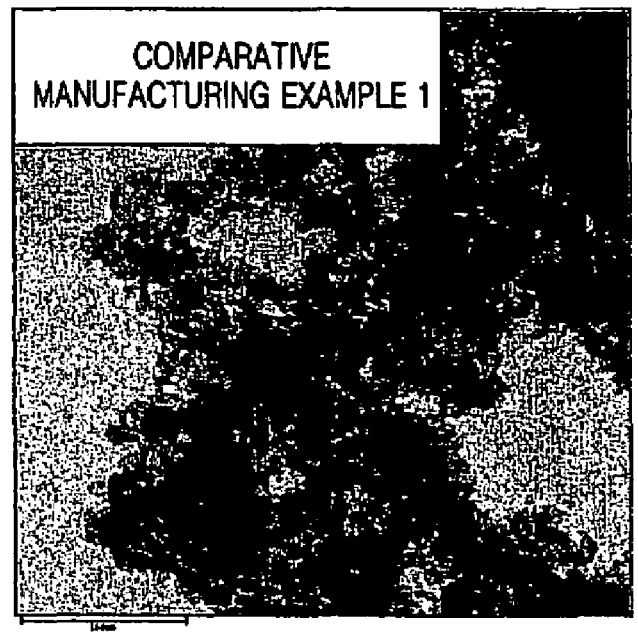
Figure 9:
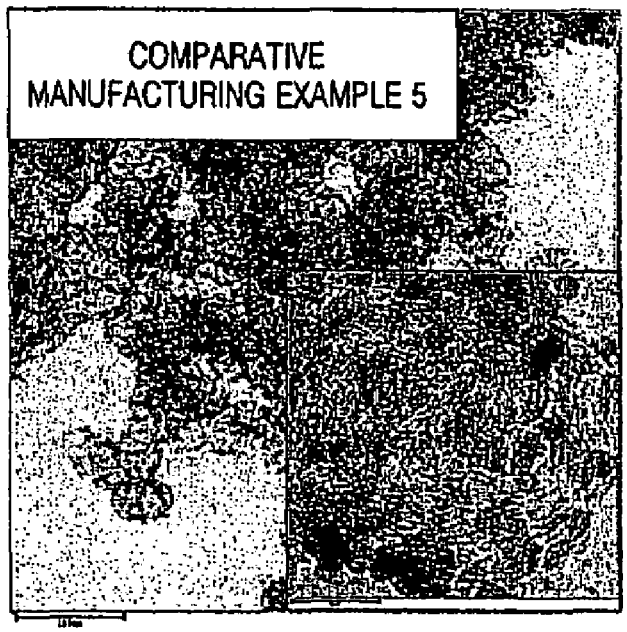

FIG. 5 illustrates a structure of a DMFC according to an Example of the present invention.

Referring to FIG. 5, the DMFC includes an anode 32 where a fuel is supplied, a cathode 30 where an oxidant is supplied, and an electrolyte membrane 40 interposed between the anode 32 and the cathode 30. In general, the anode 32 includes an anode diffusion layer 22 and an anode catalyst layer 33 and the cathode 30 includes a cathode diffusion layer 32 and a cathode catalyst layer 31. In the current embodiment of the present invention, the anode catalyst layer 33 and the cathode catalyst layer 31 include the supported catalyst prepared according to the previously described process according to aspects of the present invention.

A bipolar plate 50 has a path for supplying the fuel to the anode 32 and acts as an electron conductor for transporting electrons produced in the anode 32 to an external circuit or an adjacent unit cell. A bipolar plate 50 has a path for supplying the oxidant to the cathode 30 and acts as an electron conductor for transporting electrons supplied from the external circuit or the adjacent unit cell to the cathode 30. In the DMFC according to an embodiment of the present invention, an aqueous methanol solution is mainly used as the fuel supplied to the anode 32 and air is mainly used as the oxidant supplied to the cathode 30.

The aqueous methanol solution transported to the anode catalyst layer 33 through the anode diffusion layer 22 is decomposed into electrons, protons, carbon dioxide, and the like. The protons are transported to the cathode catalyst layer 31 through the electrolyte membrane 40, the electrons are transported to an external circuit, and the carbon dioxide is discharged to the outside. In the cathode catalyst layer 31, the protons transported through the electrolyte membrane 40, the electrons supplied from an external circuit, and the oxygen in the air transported through the cathode diffusion layer 32 react to produce water.

In such a DMFC, the electrolyte membrane 40 acts as a proton conductor, an electron insulator, a separator, and the like. The separator prevents unreacted fuel from being transported to the cathode 30 or unreacted oxidant from being transported to the anode 32.

In the DMFC according to the current embodiment of the present invention, materials for forming the electrolyte membrane 40 include a cation exchanging polymer electrolyte, such as highly fluorinated polymer (for example, NAFION, available from Dupont), which is sulfonated, having a main chain formed of fluorinated alkylene and a side chain formed of fluorinated vinyl ether having a sulfonic acid group on an end thereof.

Aspects of the present invention will be described in more detail with reference to the following examples. The following examples are for illustrative purposes and are not intended to limit the scope of the present invention.

Manufacturing Example 1

1.4656 g of the catalyst metal precursor, $H_2PtCl_6 \cdot xH_2O$ (Umicore, Pt content: 39.8 wt %), was dissolved in 10 g of ethylene glycol (EG) and then the mixture containing the catalyst metal precursor was prepared. 0.25 g of the carbon (KB, $S_E$=800 m$^2$/g) was added to 267 g of the solution of EG and water (150 g of EG, 117 g of $H_2O$) and then, the solution was dispersed by sonicating for 20 minutes. The metal precursor mixture and the carbon-dispersed mixture were stirred for 10 minutes. Then the pH of the resultant was adjusted to 11 with a solution of 1M NaOH and once more, stirred for 10 minutes.

The resultant was maintained for 2 hours after raising the temperature to 105° C. in 35 minutes (heating rate: 2.29° C./min) at room temperature (25° C.). The temperature of the resultant was then raised to 110° C., maintained again for 1 hour, and then, cooled down to room temperature. The metal precursor solution (1.4656 g of $H_2PtCl_6 \cdot xH_2O$ and 10 g of EG) and 6 g of $H_2O$ were added to the resultant at room temperature and the pH of the resultant was adjusted to 11. Such a heating process was performed once more. The obtained catalyst was washed 3 to 4 times using a centrifugal separator and dried in a lyophilizer. Finally, an 82.4 wt % Pt/C catalyst having a multi-layer structure was prepared.

Manufacturing Example 2

Preparing Supported Catalyst

An 87.5 wt % Pt/C catalyst having a multi-layer structure was prepared in the same manner as in Manufacturing Example 1, except that the reduction process (that is, the operations of combining metal precursor mixture and the carbon-dispersed mixture or resultant and heating) was performed once more (for a total of three repetitions).

Manufacturing Example 3

Preparing Supported Catalyst

An 85.7 wt % Pt/C catalyst having a multi-layer structure was prepared in the same manner as in Manufacturing Example 1, except that 1.8844 g of the catalyst metal precursor ($H_2PtCl_6 \cdot xH_2O$) and 367 g of the solution mixed with EG and water (210 g of EG, 157 g of $H_2O$) were used.

Manufacturing Example 4

Preparing Supported Catalyst

A 90 wt % Pt/C catalyst was prepared in the same manner as in manufacturing Example 3, except that a reduction process was performed once more.

Manufacturing Example 5

Preparing Supported Catalyst

An 88.9 wt % Pt/C catalyst having a multi-layer structure was prepared in the same manner as in Example 1, except that 2.5126 g of the catalyst metal precursor ($H_2PtCl_6 \cdot xH_2O$) and 467 g of the solution mixed with EG and water (267 g of EG, 200 g of $H_2O$) were used.

Manufacturing Example 6

Preparing Supported Catalyst

A 92.3 wt % Pt/C catalyst was prepared in the same manner as in Manufacturing Example 5, except that a reduction process was performed once more.

Comparative Manufacturing Example 1

Conventional Catalyst

The product of Comparative Manufacturing Example 1 is a commercially obtainable catalyst, Pt-black (Johnson & Matthey, HiSPEC1000).

Comparative Manufacturing Example 2

Preparing Supported Catalyst 0.9422 g of the catalyst metal precursor, $H_2PtCl_6 \cdot xH_2O$ (Umicore, Pt content: 39.8 wt %) was dissolved in 20 g of ethylene glycol (EG), and then the mixture containing the catalyst metal precursor was prepared. 0.25 g of the carbon (KB, $S_E$=800 m$^2$/g) was added to 180 g of the solution mixed with EG and water (80 g of EG, 100 g of $H_2O$) and then, the solution was dispersed by sonicating for 20 minutes. The metal precursor mixture and the carbon-dispersed mixture were stirred for 10 minutes. Then, the pH of the resultant was adjusted to 11 with a solution of 1M NaOH and once more, stirred for 10 minutes.

The resultant was maintained for 2 hours after raising the temperature to 105° C. in 35 minutes (heating rate: 2.29° C./min) at room temperature (25° C.). The temperature of the resultant was then raised to 110° C., maintained again for 1 hour, and then, cooled down to room temperature. The obtained catalyst was washed 3 to 4 times using a centrifugal separator and dried in a lyophilizer. Finally, a 60 wt % Pt/C catalyst having a mono-layer structure was prepared.

Comparative Manufacturing Example 3

Preparing Supported Catalyst

A 70 wt % Pt/C catalyst having a mono-layer structure was prepared in the same manner as in Comparative Manufacturing Example 2, except that 1.4656 g of the catalyst metal precursor ($H_2PtCl_6 \cdot xH_2O$) and 280 g of the solution mixed with EG and water (160 g of EG, 120 g of $H_2O$) were used.

Comparative Manufacturing Example 4

Preparing Supported Catalyst

A 75 wt % Pt/C catalyst having a mono-layer structure was prepared in the same manner as in Comparative Manufacturing Example 2, except that 1.8844 g of the catalyst metal precursor ($H_2PtCl_6 \cdot xH_2O$) and 380 g of the solution mixed with EG and water (220 g of EG, 160 g of $H_2O$) were used.

Comparative Manufacturing Example 5

Preparing Supported Catalyst

An 80 wt % Pt/C catalyst having a mono-layer structure was prepared in the same manner as in Comparative Example 2, except that 2.5126 g of the catalyst metal precursor ($H_2PtCl_6 \cdot xH_2O$) and 480 g of the solution mixed with EG and water (280 g of EG, 200 g of $H_2O$) were used.

According to the above Manufacturing Examples 1 through 6 and Comparative Manufacturing Examples 1 through 5, characteristics of the supported catalyst were investigated and the results are shown in Table 1.

For 60-80 wt % Pt/C catalysts in Table 1 that were manufactured through a single reduction process, it was identified through XRD and TEM analysis that small Pt particles having a diameter less than 3 nm were formed on the carbon. When 2-3 continuous reduction processes were performed on such mono-layered support catalysts, catalysts having a particle diameter 3.5-5 nm and an impregnated amount of 80-90 wt % could be prepared. For the other catalysts manufactured through continuous repeated reduction processes, the amount of impregnated catalyst was as high as about 90 wt %, which increases the utilization efficiency of the supported catalyst. In addition, the average particle diameters of the catalysts was about 5 nm, which is smaller than the average particle diameter of 7.7 nm of the Pt-black catalyst. Thus, it is expected that the catalysts manufactured through repeated reduction processes have higher catalyst activities.

In addition, TEM images of the supported catalysts of Manufacturing Examples 1 and 4 and Comparative Manufacturing Examples 1 and 5 were obtained. The results are shown in FIGS. 6 through 9.

Referring to FIGS. 6 through 9, in the Pt-black catalyst of Comparative Manufacturing Example 1, it can be seen that the average particle diameter is as large as 12 nm, and thus the Pt particles are seriously agglomerated. In the Pt/C catalyst of Comparative Manufacturing Example 5, Pt particles having a diameter less than 3 nm are uniformly dispersed on the carbon support so as to form a mono-layer. Compared with these examples, the Pt/C catalysts of Manufacturing Examples 1 and 4 have a multi-layered metal catalyst structure in which Pt

TABLE 1

| | Number of support with mono-layer structure | Number of reduction processes Time | Theoretical impregnated amount of Pt Parts by weight | XRD analysis Diameter of Pt nm | TEM analysis Diameter of Pt nm | ICP analysis Impregnated amount of Pt Parts by weight |
|---|---|---|---|---|---|---|
| Comparative Manufacturing Example 1 | Pt-black | 1 time | 100 | 7.7 | 12 | 100 |
| Comparative Manufacturing Example 2 | 60 | 1 time | 60 | 2.65 | 2.93 | 56.9 |
| Comparative Manufacturing Example 3 | 70 | 1 time | 70 | 2.82 | 3.02 | 67 |
| Comparative Manufacturing Example 4 | 75 | 1 time | 75 | 3.02 | 2.89 | 70.7 |
| Comparative Manufacturing Example 5 | 80 | 1 time | 80 | 3.85 | 2.88 | 76.2 |
| Manufacturing Example 1 | 70 | 2 times | 82.4 | 3.85 | 3.37 | 77.3 |
| Manufacturing Example 2 | 70 | 3 times | 87.5 | 4.36 | 3.32 | 76.3 |
| Manufacturing Example 3 | 75 | 2 times | 85.7 | 4.18 | 3.74 | 82 |
| Manufacturing Example 4 | 75 | 3 times | 90 | 4.59 | 3.59 | 85.2 |
| Manufacturing Example 5 | 80 | 2 times | 88.9 | 4.70 | 4.66 | 84.7 |
| Manufacturing Example 6 | 80 | 3 times | 92.3 | 5.32 | 3.83 | 87 | particles are dispersed on the carbon support so as to form a mono-layer and in which another layer of Pt particles is formed on the mono-layer.

Example 1

Fabrication of a Fuel Cell

A fuel cell using a catalyst layer obtained using the supported catalyst of Manufacturing Example 1 was fabricated as follows.

In forming an anode and a cathode used in the fuel cell of the present Example, PtRu-black (HiSPEC 600) 5 mg/cm$^2$ and 3 mg/cm$^2$ (Pt standard) of the supported catalyst of Manufacturing Example 1 were sprayed onto the surfaces of the anode and cathode diffusion layers 22 and 32. NAFION 115 membrane was used as an electrolyte membrane. The obtained anode, cathode, and electrolyte membrane were joined under a pressure of 5 Mpa at 120° C. to prepare a membrane and electrode assembly (MEA). The MEA is a structure in which the catalyst layer and an electrode are sequentially laminated on both surfaces of a proton conductive polymer membrane.

A bipolar plate for supplying fuel and a bipolar plate for supplying an oxidant were attached to the anode and the cathode, respectively, of the fuel cell prepared according to Example 1, and then the performance of the fuel cell was determined. The operating conditions were as follows: 0.28 mL/min of 1M aqueous methanol solution as fuel, 52.5 mL/min of air as an oxidant, and an operating temperature of 50° C.

Example 2

Fabrication of a Fuel Cell

A fuel cell was fabricated in the same manner as in Example 1, except that the supported catalyst in Manufacturing Example 4 was used instead of the supported catalyst in Manufacturing Example 1 during the fabrication of the catalyst layer.

Comparative Example 1

Fabrication of a Fuel Cell

A fuel cell was fabricated in the same manner as in Example 1, except that the supported catalyst in Comparative Manufacturing Example 1 was used instead of the supported catalyst in Manufacturing Example 1 during the fabrication of the catalyst layer.

Comparative Example 2

Fabrication of a Fuel Cell

A fuel cell was fabricated in the same manner as in Comparative Example 1, except that the supported catalyst in Comparative Manufacturing Example 2 was used instead of the supported catalyst in Comparative Manufacturing Example 1 during the fabrication of the catalyst layer.

Comparative Example 3

Fabrication of a Fuel Cell

A fuel cell was fabricated in the same manner as in Comparative Example 1, except that the supported catalyst in Comparative Manufacturing Example 3 was used instead of the supported catalyst in Comparative Manufacturing Example 1 during the fabrication of the catalyst layer.

Comparative Example 4

Fabrication of a Fuel Cell

A fuel cell was fabricated in the same manner as in Comparative Example 1, except that the supported catalyst in Comparative Manufacturing Example 5 was used instead of the supported catalyst in Comparative Example 1 during the fabrication of the catalyst layer.

Figure 10:
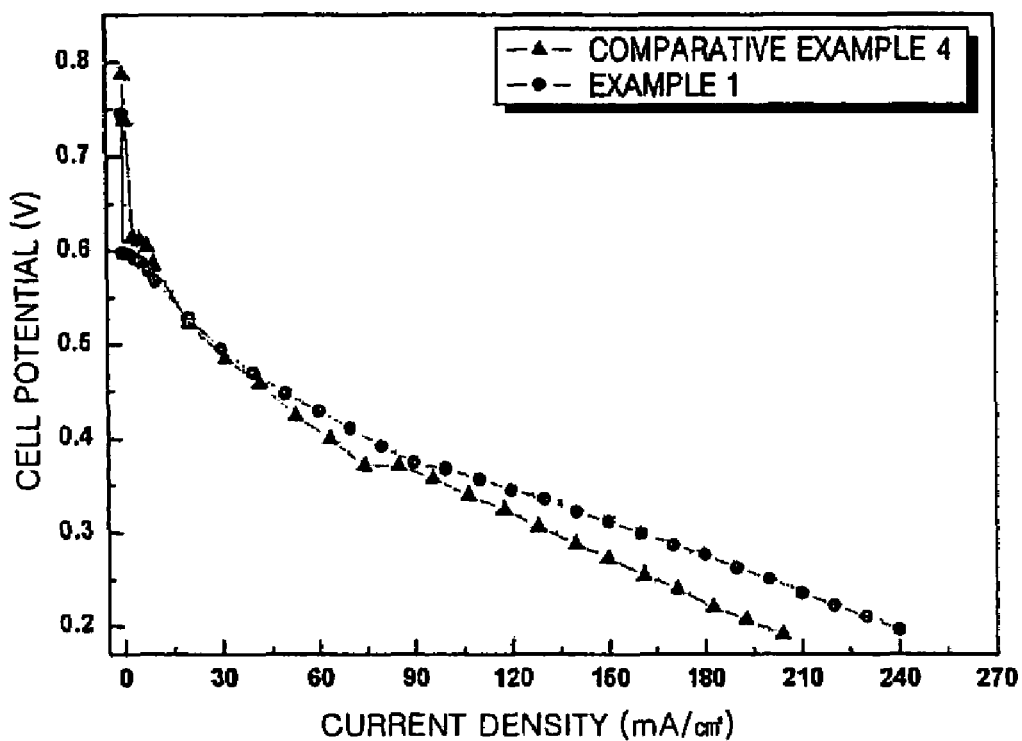
FIGS. 10 and 11 are graphs showing a relationship between cell potential and current density of the fuel cells prepared according to Examples 1 and 2 and Comparative Examples 1 and 4 of the present invention.

In the fuel cells of Example 1 and Comparative Example 4, the change in the cell potential with respect to current density was investigated and the results are shown in FIG. 10. In the fuel cells of Example 2 and Comparative Example 1, the change in the cell potential with respect to current density was investigated and the results are shown in FIG. 11.

Figure 11:
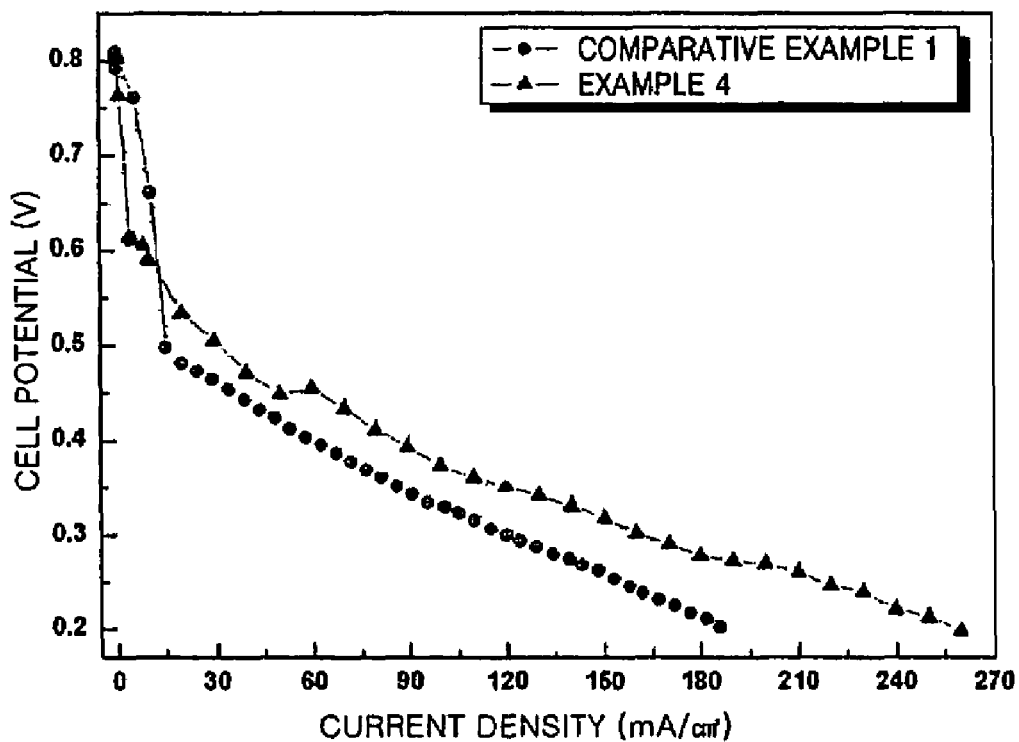

Referring to FIGS. 10 and 11, each of the fuel cells in Examples 1 and 2 had a higher cell potential than that of Comparative Examples 1 and 4.

The current density of the fuel cells according to Examples 1 and 2 and Comparative Examples 1 through 4 was investigated at 0.4 V at 50° C. and the results are illustrated in Table 2.

TABLE 2

|  | Current density (mA/cm$^2$) |
|---|---|
| Example 1 | 76.9 |
| Example 2 | 85 |
| Comparative Example 1 | 61.1 |
| Comparative Example 2 | 67.4 |
| Comparative Example 3 | 64.1 |
| Comparative Example 4 | 63.1 |

While the fuel cell of Comparative Example 1 includes the Pt-black catalyst, the fuel cells of Comparative Examples 2 though 4 include supported catalysts with a mono-layer structure having a particle diameter as small as less than 3 nm and an impregnated amount of 60-80 wt %. However, referring to Table 2, the performances of the fuel cells of Comparative Examples 2 though 4 having such a mono-layer structure are not so high for their small catalyst particle diameters. From these results, it was identified that, when Pt particles are embedded in the carbon support and form a mono-layer structure, the utilization efficiency of the catalyst does not increase even when the amount of the impregnated Pt catalyst with respect to carbon is higher.

However, in the case of Examples 1 and 2, which have a multi-layer structure, since Pt particles were formed on Pt particles, usage of the Pt particles increases in the supported catalysts. Since the impregnated amount was increased to 80-90 wt %, the thickness of the catalyst layer could be decreased, thereby improving catalytic activities.

In a supported catalyst according to an embodiment of the present invention, when small metal catalyst particles having an average diameter of 3.5 to 5 nm are dispersed therein with high concentration, the catalytic efficiency is increased. A fuel cell having improved energy density and fuel efficiency characteristics can be prepared using electrodes formed using the supported catalyst according to an aspect of the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A supported catalyst comprising:
   a carbon-based catalyst support; and
   a multi-layer structure of metal catalyst particles having an average diameter of 3.5 to 5 nm on the carbon-based catalyst support and wherein an amount of metal catalyst particles is 80 to 90 parts by weight based on 100 parts by weight of the supported catalyst.

2. The supported catalyst of claim 1, wherein the metal catalyst particles are formed of at least one material selected from the group consisting of platinum (Pt), ruthenium (Ru), palladium (Pd), rhodium (Rh), iridium (Ir), osmium (Os) and gold (Au).

3. The supported catalyst of claim 1, wherein the multi-layer structure of the metal catalyst particles is a structure in which second metal catalyst particles are impregnated on an upper surface of first metal catalyst particles disposed on the carbon-based catalyst support.

4. The supported catalyst of claim 1, wherein a number of layers in the multi-layer structure of the metal catalyst particles is 2 or 3.

5. The supported catalyst of claim 1, wherein the carbon-based catalyst support has a surface area of 250 $m^2/g$ or greater and an average particle diameter of 10 to 500 nm.

6. The supported catalyst of claim 1, wherein the carbon-based catalyst support comprises at least one material selected from the group consisting of carbon black, Ketjen black, acetylene black, activated carbon powder, carbon molecular sieve, carbon nanotubes, activated carbon having micropores, and mesoporous carbon.

7. An electrode having the supported catalyst according to claim 1.

8. A fuel cell including an electrode having the supported catalyst according to claim 1.

9. A fuel cell comprising:
   a cathode;
   an anode; and
   an electrolyte membrane interposed between the cathode and the anode, wherein at least one of the cathode and the anode contains the supported catalyst of claim 1.

* * * * *